June 21, 1927.  A. J. PAYNTER  1,633,126
ROTARY SIEVE
Filed March 17, 1926
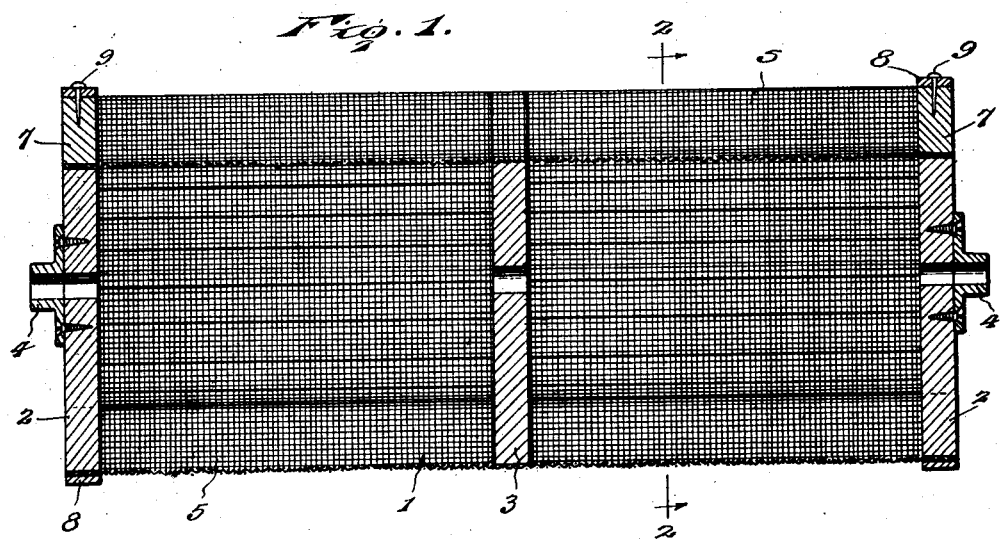
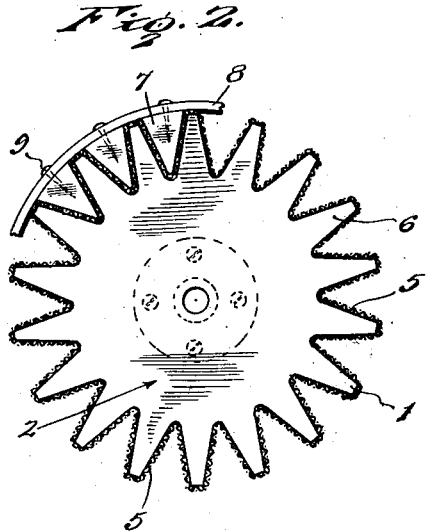 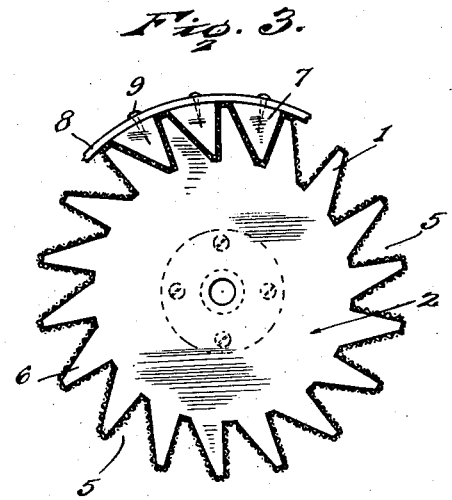
Inventor
A. J. Paynter.
By Lacey & Lacey, Attorneys Patented June 21, 1927.

1,633,126

UNITED STATES PATENT OFFICE.

ALBERT J. PAYNTER, OF OSBORNE, KANSAS.

ROTARY SIEVE.

Application filed March 17, 1926. Serial No. 95,365.

This invention relates to sieves for milling and separating machinery and provides a rotary sieve for grain separators, corn shellers, graders and like machinery for separating and sorting.

In accordance with the invention, the sieve which is of cylindrical form and mounted to rotate, is provided in its circumference with pockets which flare outwardly and consist preferably of parallel corrugations or flutes extending lengthwise of the sieve and formed by bending the sieve material back and forth.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a central, longitudinal sectional view of a rotary sieve embodying the invention, Figure 2 is a transverse sectional view on the line 2—2 of Figure 1, and Figure 3 is a view similar to Figure 2 of a modification.

Corresponding and like parts are referred to in the following description and designated in the several views of the drawings by like reference characters.

The numeral 1 designates the body of the sieve which is of cylindrical form. The sieve may be constructed of any suitable material such as wire fabric or reticulated or foraminous sheet metal and may be of any length and diameter. The sieve is closed and reinforced at its ends by heads 2 and may be strengthened and braced intermediate its ends by suitable supporting means, as 3. The support 3 and heads 2 are provided with central openings to receive a shaft or other mounting means, as will be readily appreciated. Metal plates 4 are applied to the heads 2 in line with the openings formed in the center thereof and are adapted to receive the mounting means. The material and the size of the mesh or openings thereof will depend upon the specific use for which the sieve is intended.

The circumference of the sieve is provided with pockets 5, which flare outwardly and which may be of any size, most advantageous for the particular work to be performed. The pockets 5 extend lengthwise of the sieve and preferably consist of corrugations, flutes or folds resulting from bending the material backward and forward, as indicated most clearly in Figures 2 and 3. The heads 2 and the support 3 are formed with points 6 which conform to the return folds or corrugations, so as to maintain the normal shape thereof. The sides of the pockets 5 may be symmetrical, as indicated most clearly in Figure 2, or may be of different relative angles, as indicated in Figure 3. The sides or walls of the pockets may be at an angle found most advantageous according to the particular work for which the sieve is designed.

The sieve is adapted for a variety of uses in milling machinery, grain separators, corn shellers, fruit sorters and the like and in practice is mounted so as to rotate about an axis, the material being delivered upon the outer surface of the sieve and received in the pockets, which together with the meshes or openings of the material, effect the separation, grading and the like, as required. Light material may be carried off by a blast of air, such as commonly employed in separating and cleaning machinery.

The pockets 5 are preferably closed at their ends to prevent discharge of the material at the ends of the sieve. The closures 7 are blocks, or the like, of V-form and may be retained in place in any manner as by a band or hoop 8 and nails 9 passed through the band and driven into the closures.

Having thus described the invention, I claim:

A rotary sieve comprising a cylindrical body of foraminous material, circular heads in the ends of said body, said heads being formed with centrally disposed alined shaft receiving openings and having their peripheral portions formed with radially disposed recesses having marginal faces diverging towards the open outer ends of the recesses, one marginal face of each recess extending along a radius of the head and the other marginal face thereof extending semi-tangentially of the head, said body being crimped longitudinally to form inwardly tapered pockets conforming transversely to the contour of the recess having their end portions seated in the recesses of said heads in close contacting engagement with the marginal faces thereof, filler blocks fitting snugly in the ends of said pockets and forming closures for the ends of the pockets and completing members for the circular heads, bands extending circumferentially about said heads in overlying relation to said blocks, and fasteners securing said band to said blocks.

In testimony whereof I affix my signature.

ALBERT J. PAYNTER. [L. S.]